US007526663B2

(12) United States Patent
Nguyen et al.

(10) Patent No.: US 7,526,663 B2
(45) Date of Patent: *Apr. 28, 2009

(54) METHOD AND APPARATUS FOR REDUCING THE POWER CONSUMED BY A COMPUTER SYSTEM

(75) Inventors: Don J. Nguyen, Portland, OR (US);
Pochang Hsu, Fremont, CA (US);
Robert T. Jackson, San Jose, CA (US);
John W. Horigan, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 358 days.

This patent is subject to a terminal disclaimer.

(21) Appl. No.: 11/402,527

(22) Filed: Apr. 11, 2006

(65) Prior Publication Data

US 2006/0184812 A1    Aug. 17, 2006

Related U.S. Application Data

(63) Continuation of application No. 10/159,536, filed on May 31, 2002, now Pat. No. 7,062,647.

(51) Int. Cl.
*G06F 1/26* (2006.01)

(52) U.S. Cl. .................. 713/323; 713/321; 323/282

(58) Field of Classification Search .................. 713/300, 713/323, 321; 323/282
See application file for complete search history.

(56) References Cited

U.S. PATENT DOCUMENTS

| 5,919,262 | A | * | 7/1999 | Kikinis et al. | 323/282 |
| 5,926,394 | A | | 7/1999 | Nguyen et al. | 364/489 |
| 6,150,804 | A | * | 11/2000 | Taghizadeh-Kaschani | 323/285 |
| 6,229,292 | B1 | * | 5/2001 | Redl et al. | 323/285 |
| 6,304,823 | B1 | * | 10/2001 | Smit et al. | 702/60 |
| 6,522,111 | B2 | * | 2/2003 | Zadeh et al. | 323/277 |
| 6,590,369 | B2 | * | 7/2003 | Burstein et al. | 323/272 |
| 6,611,169 | B2 | * | 8/2003 | Mendenhall | 330/51 |
| 6,697,952 | B1 | * | 2/2004 | King | 713/300 |
| 2004/0130305 | A1 | * | 7/2004 | Agari et al. | 323/282 |

* cited by examiner

*Primary Examiner*—Thuan N Du
(74) *Attorney, Agent, or Firm*—Blakely, Sokoloff, Taylor & Zafman LLP (57) ABSTRACT

A computer system having one or more components capable of being in either wake or sleep states includes a power manager and a voltage regulator. The power manager may generate a power state signal indicating the power state of the component, and this signal may be provided to the voltage regulator. The voltage regulator may supply power to the component. The target voltage level of the power may be dependent on both a current level of the power and the power state signal.

19 Claims, 4 Drawing Sheets

METHOD AND APPARATUS FOR REDUCING THE POWER CONSUMED BY A COMPUTER SYSTEM

This application is a Continuation of U.S. patent application Ser. No. 10/159,536, filed May 31, 2002, now U.S. Pat. No. 7,062,647 which is incorporated by reference herein by its entirety.

The present invention relates to computer systems and more particularly to reducing the power consumed by a computer system by reducing the leakage current of components of the computer system powered by a voltage regulator.

BACKGROUND

Computer systems are becoming increasingly pervasive in our society, including everything from small handheld electronic devices, such as personal data assistants and cellular phones, to application-specific electronic devices, such as set-top boxes, digital cameras, and other consumer electronics, to medium-sized mobile systems such as notebook, sub-notebook, and tablet computers, to desktop systems, workstations, and servers. Computer systems typically include one or more processors. A processor manipulates and controls the flow of data in a computer by executing instructions. To provide more powerful computer systems for consumers, processor designers strive to continually increase the operating speed of the processor. Unfortunately, as processor speed increases, the power consumed by the processor tends to increase as well.

Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

One method of reducing the amount of electric power drawn by a computer system is to design the system such that it is capable of operating in two different states. In a first state of operation, only the most vital functions of the system, such as those dedicated to monitoring for user input, may be active. This may be referred to as a "sleep state." During the sleep state, the computer system may draw very little power from a voltage regulator (alternatively referred to as the power supply/source, voltage supply/source, or Vcc supply/source). In a second state of operation, the computer system may be busy executing instructions to accomplish a particular task. This may be referred to as a "wake state." During the wake state, the computer system may consume a significant amount of power from a voltage regulator. Various components of the computer system similarly operate in sleep and wake states. The definition of these states, with respect to individual components, tends to be particular to the design and function of the component.

Unfortunately, a computer system and its components may be designed to operate more efficiently during one state than during another, resulting in poor average power consumption over an extended period of time.

One or more embodiments of the present invention may address this and other issues associated with the prior art.

BRIEF DESCRIPTION OF THE DRAWINGS

Embodiments of the present invention are illustrated by way of example and not limitation in the accompanying figures in which like references indicate similar elements and in which.

DETAILED DESCRIPTION

In accordance with an embodiment of the present invention, a voltage regulator may supply power (alternatively referred to as a supply voltage or Vcc) to one or more components within a computer system. A power manager of the computer system may provide a power state signal indicating the power state of the component, and this signal may be provided to the voltage regulator. The target voltage level of the power supplied by the voltage regulator to the component may increase as the current level of the power supplied by the voltage regulator decreases, and vice-versa. The target voltage level of the power supplied by the voltage regulator to the component may also be adjusted in response to the power state signal.

For example, if the power state signal indicates a component's transition from a sleep state to a wake state, the target voltage level of the power supplied from the voltage regulator to the component may be increased. This increase may occur in advance of the actual transition from the sleep state to the wake state by the component. The actual transition from the sleep state to the wake state by the component may have an associated rapid increase (i.e. upward spike) in the current level of the power supplied from the voltage regulator to the component.

Similarly, if the power state signal indicates the component's transition from a wake state to a sleep state, the target voltage level of the power supplied from the voltage regulator to the component may be decreased. This decrease may occur after the actual transition from the wake state to the sleep state by the component. The actual transition from the wake state to the sleep state by the component may have an associated rapid decrease (i.e. downward spike) in the current level of the power supplied from the voltage regulator to the component. In this manner, the voltage regulator may be operated with a reduced voltage level while the component is in a sleep state, reducing leakage power through the component. Thus, power consumption of the overall computer system may be reduced.

A more detailed description of embodiments of the present invention, including various configurations and implementations, is provided below.

As used herein, the terms "wake" and "sleep" are relative indications of the power state of one or more components of a computer system. A component in a wake state may generally consume more power, on average, than the same component in a sleep state. In accordance with one embodiment, a component in a wake state may be either in an operational state or is ready for operation (i.e. receiving, transmitting, or accessing data or ready to receive, transmit, or access data). A component in a sleep state may be in a non-operational state. For example, a component that manipulates or communicates data utilizing an internal clock signal for synchronization may be considered to be in a wake state while the internal clock is running and in a sleep state while the internal clock is stopped. As another example, a device such as a hard drive, floppy drive, or DVD may be considered to be in a wake state while its storage medium is spinning and in a sleep state while it's storage medium is not spinning (or is spinning at a speed that is less than a predetermined speed).

For one embodiment, the terms "wake" and "sleep" may be interpreted in accordance with the ACPI specification (Advanced Configuration and Power Interface Specification, Rev. 2.0, published Jul. 27, 2000, by Compaq, Intel, Microsoft, Phoenix, and Toshiba), but is not to be so limited. Note that what is referred to herein as a sleep state may alternatively be referred to as an inactive, power-down, deep power-down, deep sleep, low power, suspend, or idle state.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. In addition, as used herein, the term "while" is intended to mean during all or some portion of time within the period of time that satisfies a condition. For example, the statement "event 'A' occurs while event 'B' occurs" is intended to mean that event A may occur during all or some portion of the period of time during which event B occurs.

Figure 1:
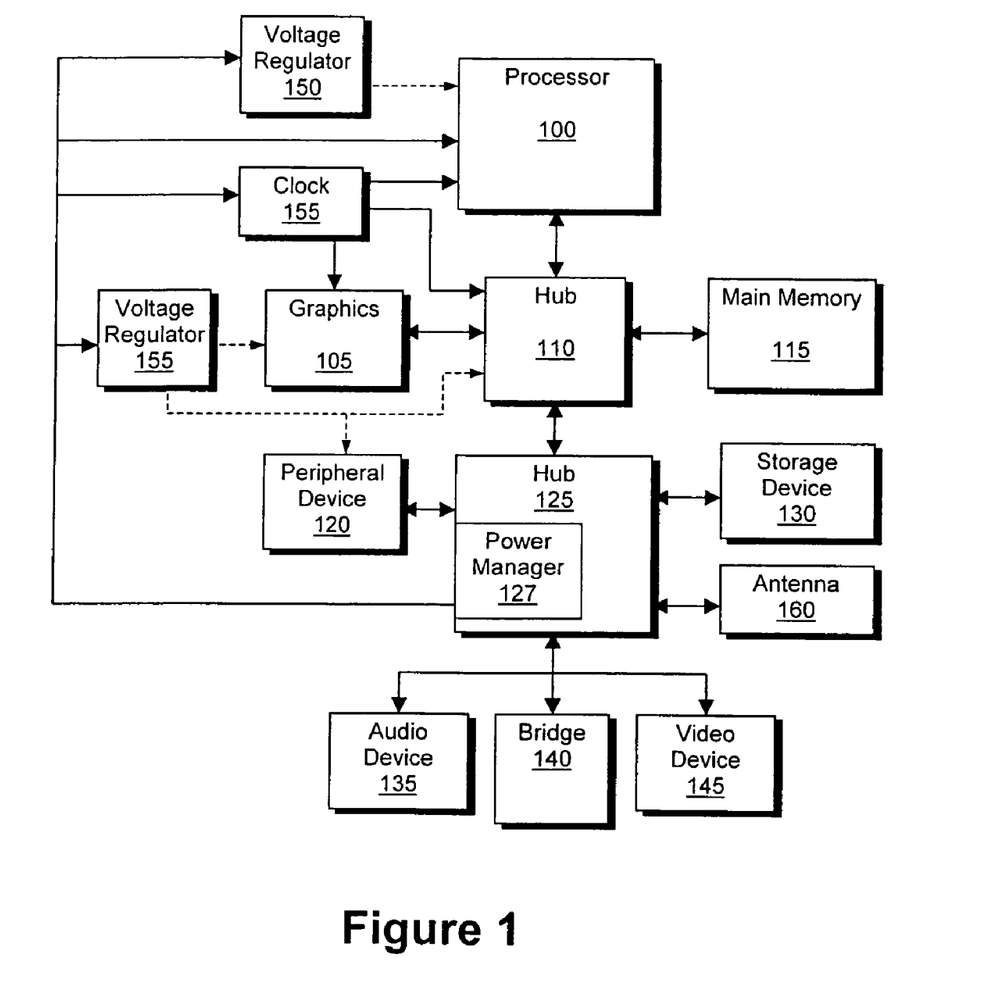
FIG. 1 includes an example of a computer system.

FIG. 1 includes an example of a computer system. As shown, the computer system may include a processor 100 coupled to hub 110. Voltage regulator 150 may supply power to processor 100, and clock 155 may provide a clock signal to processor 100. Processor 100 may communicate with graphics controller 105, main memory 115, and hub 125 via hub 110. Hub 125 may couple peripheral device 120, storage device 130, audio device 135, video device 145, antenna 160, and bridge 140 to hub 110. Voltage regulator 155 may supply power to graphics controller 105, peripheral device 120, and hub 110.

Voltage regulators 150 and 155 of FIG. 1 may supply power to one or more components of the computer system, and may receive power state signals indicating one or more power states of the one or more components powered by the voltage regulators. The power supplied by the voltage regulator has an associated voltage level and current level. The voltage level of the power supplied by the voltage regulator may be provided at a target voltage level determined by the design and characteristics of the voltage regulator. Rapid changes in the current level of the power may cause voltage transients in the voltage level of the power supplied by the voltage regulator, causing the voltage level to briefly deviate from the target voltage level. The current consumed by the component (or multiple components) powered by the voltage regulator may determine the current level of the power.

Audio device 135 of FIG. 1 may include, for example, a speaker, a microphone, or other input/output device. Video device 145 may include, for example, a display screen, a camera, or other video input/output device. Bridge 140 may couple hub 125 to one or more additional buses coupled to one or more additional peripheral devices. Antenna 160 may couple the computer system to one or more wireless networks in accordance with one or more wireless communication protocols. Peripheral device 120 may be one or more other peripheral devices.

Hub 125 of FIG. 1 may include a power manager 127. Power manager 127 may send power state signals to voltage regulators 150 and 155, processor 100 and clock 155. These power state signals may be in accordance with ACPI states and signals. Power state signals may indicate the power states of one or more components of the computer system. In accordance with an alternate embodiment, power manager 127 may reside within a different component of the computer system, may be a discrete component, or may be distributed among multiple components of the computer system. For example, each component coupled to a voltage regulator may send its own power state signal separately to the voltage regulator to indicate its power state. It is to be noted that the power state signal provided to the voltage regulator may indicate a power state transition of an associated component (or of multiple components) before, after, or during the power state transition of the component.

In accordance with an embodiment, a computer system may include more or fewer components than those shown in FIG. 1, and the components of FIG. 1 may be partitioned differently. For example, multiple components may be integrated into a single component, and single components may be divided into multiple components. Note that the term "processor" may be used herein to refer to one or more of a central processing unit, a processor of a symmetric or asymmetric multiprocessing system, a digital signal processor, a microcontroller, etc.

Multiple components of the computer system of FIG. 1 may be capable of entering wake and sleep states. For example, processor 100 may have a fully operational wake state, a partially operational wake state, a partial sleep state, a regular sleep state, a deeper sleep state, etc. Similarly, graphics controller 105 and hubs 110 and 125 may have multiple wake and sleep states. Note that a chipset of the computer system may include hubs 110 and 125.

Figure 2:
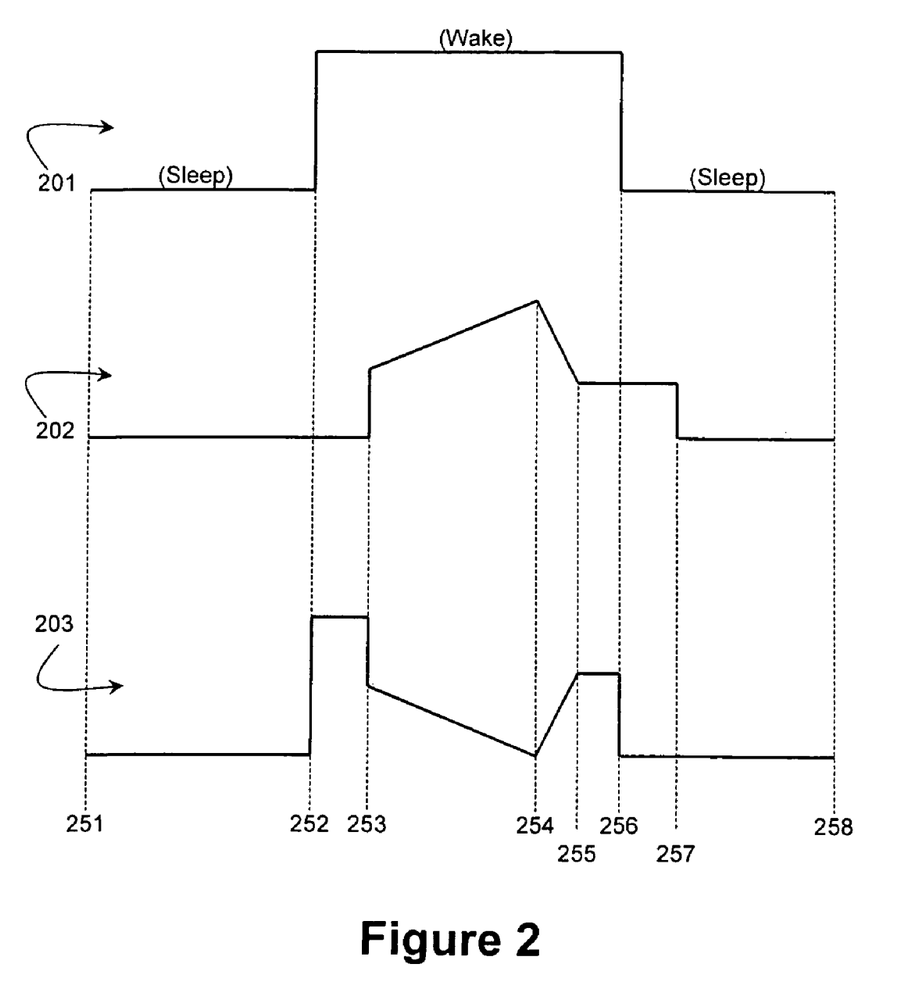
FIG. 2 includes an example of a timing diagram.

FIG. 2 includes a timing diagram. The timing diagram includes power state signal 201 provided from a power manager to a voltage regulator, and current level 202 of the power supplied by the voltage regulator to a component of the computer system. Power state signal 201 may indicate the power state of the component. The timing diagram further includes target voltage level 203 of the power supplied by the voltage regulator. In accordance with an embodiment, the component may be a processor.

For one embodiment, as shown in FIG. 2, power state signal 201 is low from time 251 to time 252 to indicate that the component is in a sleep state. At time 252, power state signal 201 transitions from a low to a high level, indicating a transition to a wake state by the component. Power state signal 201 is high from time 252 to time 256 to indicate that the component is in a wake state. At time 256, power state signal 201 transitions back to a low level, indicating a transition back to a sleep state by the component. In accordance with one embodiment, power state signal 201 indicates the transitions between the sleep and wake states before the associated transition by the component.

For one embodiment, current level 202 of FIG. 2 may begin at a low level at time 251 and remains low until time 253. Current level 202 may be associated with the leakage current through the component during this time period. A rapid increase in the current level occurs at time 253. This rapid increase in the current level may be associated with the component transitioning from the sleep state to the wake state. Note that the time difference between time 253 and 252 is the time it may take for the component to transition to a wake state after power state signal 201 indicates the transition from the sleep state to the wake state at time 252. For one embodiment of the present invention, power state signal 201 may be provided to the component to trigger the component to transition between sleep and wake states. For example, power state signal 201 may be a "stop clock" signal, and the internal clock of the component may start or stop in response to receiving this signal.

For one embodiment, current level 202 of FIG. 2 may slowly increase from time 253 to time 254, then decrease at a slightly faster rate from time 254 to time 255. Current level 202 may remain steady from time 255 to time 257, and then rapidly decrease at time 257. This rapid decrease in the current level may be associated with the component transitioning from the wake state to the sleep state. Note that the time difference between time 256 and 257 is the time it may take for the component to transition to a sleep state after power state signal 201 indicates the transition from the wake state to the sleep state at time 256. Once the component re-enters the sleep state at time 257, the current level remains low, representing leakage current through the component.

For one embodiment, target voltage level 203 of FIG. 2, and, consequently, the voltage level provided at the Vcc output of the voltage regulator, may be related to current level 202 and to power state signal 201. Target voltage level 203 may begin at a low level at time 251 and remain low until time 252. By keeping the voltage level low during this period of time, the leakage power through the component may be reduced while the component is in a sleep state. In accordance with one embodiment, the voltage level during this period of time may be reduced to within plus or minus 25 mV of the lower specified supply voltage limit of the component. For example, for a component with a specified supply voltage of 1.0V and a tolerance range of plus or minus 10%, the lower specified supply voltage limit of the component is 900 mV. For this embodiment, referring again to FIG. 2, the voltage level of the power supplied to such a component from time 251 to time 252 may be within the range of 875 mV to 925 mV. For an alternate embodiment, the voltage level during this period of time may be reduced to within 5% of the lower specified supply voltage limit of the component. For another embodiment, the voltage level during this period of time may be reduced to within 2.5% of the lower specified supply voltage limit of the component.

At time 252 of FIG. 2, power state signal 201 indicates a transition from a sleep state to a wake state. In response, target voltage level 203 of the power supplied by the voltage regulator increases. The target voltage level may remain high from time 252 until time 253 when current level 202 rapidly increases, signifying the component's transition to a wake state from a sleep state. In response, target voltage level 203 may rapidly decrease at time 253.

As stated above, the time difference between time 253 and 252 of FIG. 2 is the time it takes for the component to transition to a wake state after power state signal 201 indicates the transition from the sleep state to the wake state at time 252. For one embodiment of the present invention, the voltage level at the output of the voltage regulator, Vcc, may increase to the target voltage level during this time. By allowing the voltage level of the power supplied to the component to increase to the target voltage level during this time, the system prepares for the upcoming downwardly spiking voltage transient caused by the rapid increase in the current level at time 253. Thus the voltage level of the power supplied to the component remains within the supply voltage tolerance range of the component.

For one embodiment, target voltage level 203 of FIG. 2 may slowly decrease from time 253 to time 254, as current level 202 increases. Target voltage level 203 may increase at a slightly faster rate from time 254 to time 255, as current level 202 decreases. Target voltage level 203 may then remain steady from time 255 to time 256, as current level 202 remains steady as well. Thus, target voltage level 203 is inversely proportional to current level 202 from time 253 to time 256.

At time 256 of FIG. 2, power state signal 201 indicates a transition from a wake state to a sleep state. In response, target voltage level 203 of the voltage regulator decreases. The voltage levels may remain low from time 256 until time 257 when current level 202 rapidly decreases, signifying the component's transition back to a sleep state. Note that there may be an upwardly spiking voltage transient in the voltage level of the power supplied to the component at time 257 due to the rapid decrease in the current level at this time.

For one embodiment, target voltage level 203 may remain at a low level after time 257 while the component is in a sleep state. As stated earlier, by keeping the voltage level low during this period of time, the leakage power through the component may be reduced.

Figure 3A:
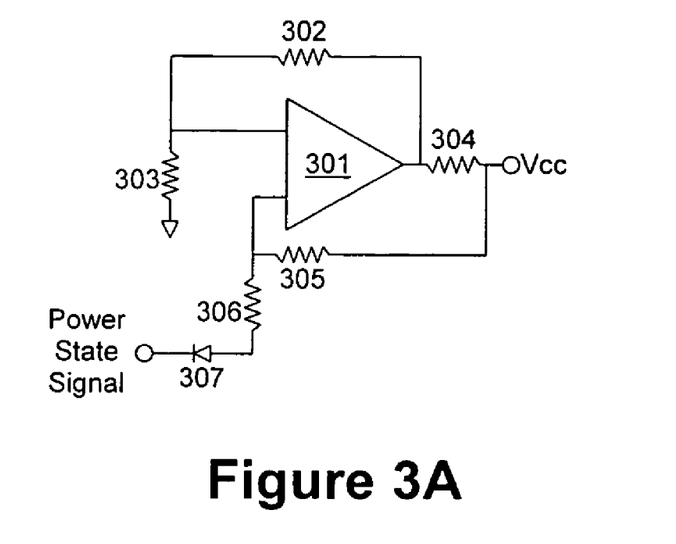
FIGS. 3A and 3B include examples of circuits.

FIG. 3A includes an example of a voltage regulator in accordance with an embodiment. A feedback line may couple an output of controller/driver 301 to an upper input, which may be a compare input of the controller/driver. The feedback line may include a resistor ladder comprising upper resistor 302 and lower resistor 303 to provide a desired feedback voltage to the input. The output of controller/driver 301 is coupled to an output port via resistor 304 to provide supply voltage Vcc. Another feedback line may couple the output port to the lower input of controller/driver 301, which may be a reference input. The feedback line may include a resistor ladder comprising upper resistor 305 and lower resistor 306 to provide a desired feedback voltage to the input. This feedback line may make the target voltage level for Vcc inversely proportional to the current level of the power supplied at the output port of the voltage regulator. For one embodiment, the voltage regulator of FIG. 3A may be a switching regulator.

An input port to receive the power state signal is coupled to resistor 306 of FIG. 3A via a diode. When the power state signal is low, indicating a sleep state of a component powered by the voltage regulator, the diode is forward biased. As a result, the feedback voltage provided at the reference input of controller/driver 301 is pulled down, thereby decreasing the target voltage level of Vcc. Conversely, when the power state signal transitions from low to high, indicating the component's transition to a wake state, the diode becomes reverse biased. As a result, the feedback voltage provided at the reference input of controller/driver 301 increases, thereby increasing the target voltage level of Vcc.

Figure 3B:
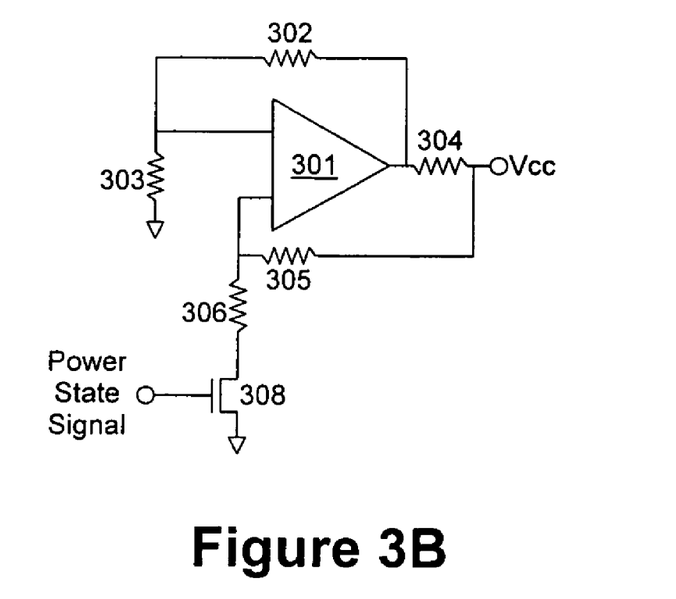

FIG. 3B includes an example of a voltage regulator in accordance with another embodiment. The voltage regulator of FIG. 3B is similar in design to the voltage regulator of FIG. 3A, except the voltage regulator of FIG. 3B may be used in an embodiment in which the power state signal uses inverted logic from that described above. Diode 307 of FIG. 3A may be replaced with transistor 308 in FIG. 3B. The gate of the transistor may be coupled to the input port to receive the power state signal. A first source/drain region of the transistor may be coupled to resistor 306 and the other source/drain region may be coupled to ground.

When the power state signal is high, indicating a sleep state of a component powered by the voltage regulator, transistor 308 of FIG. 3B is turned on. As a result, the feedback voltage provided at the reference input of controller/driver 301 is pulled down, thereby decreasing the target voltage level of Vcc. Conversely, when the power state signal is low, indicating a wake state of the component, the transistor is off. As a result, the feedback voltage provided at the reference input of controller/driver 301 is higher, thereby increasing the target voltage level of Vcc.

Figure 4:
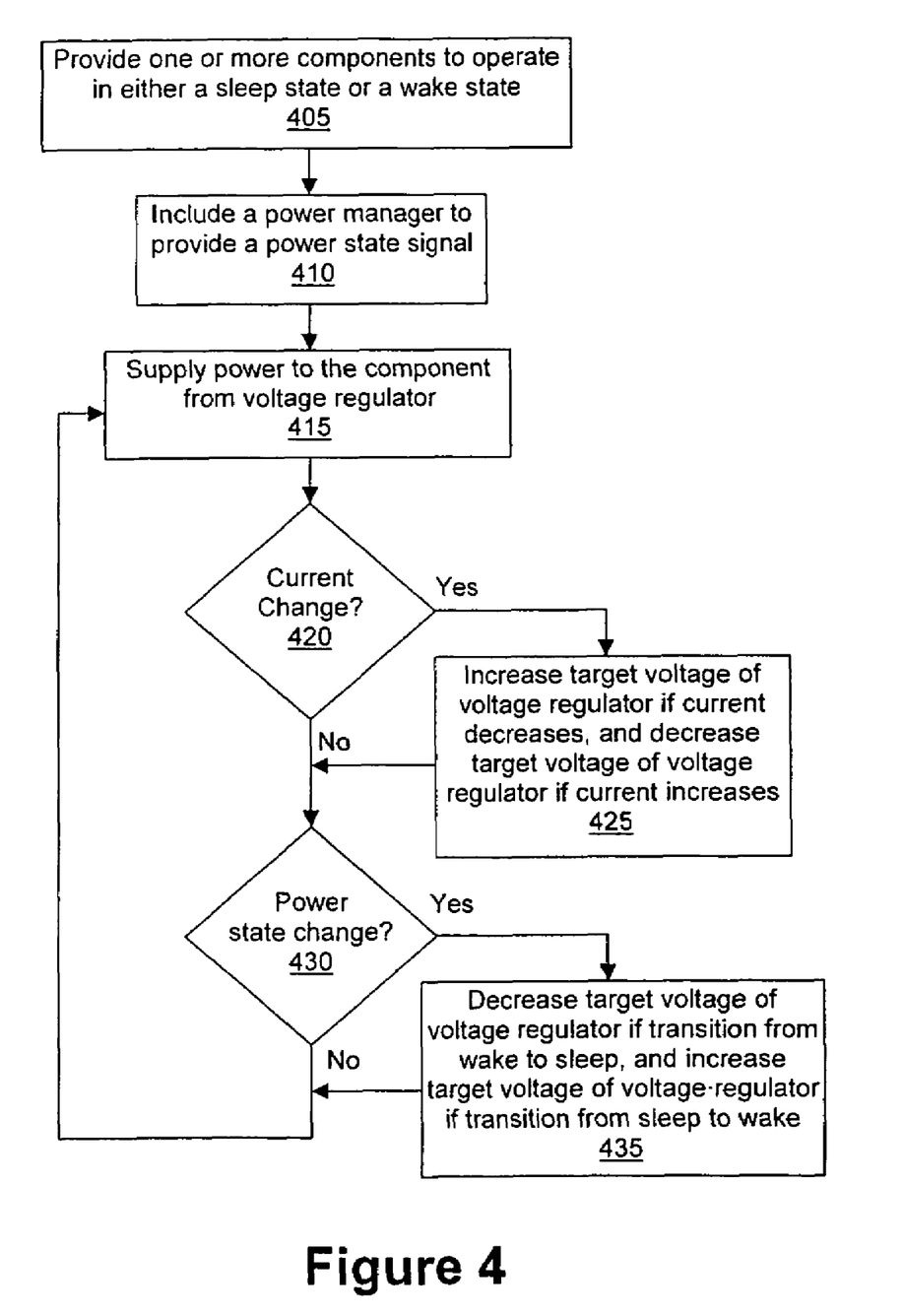
FIG. 4 includes a flow chart.

FIG. 4 includes a flow chart. At block 405 of FIG. 4, one or more components are provided in a computer system to operate in sleep and wake states. At block 410, a power manager is also included in the computer system to provide a power state signal, associated with the component, to a voltage regulator via a power state signal line. Next at block 415, power is supplied from the voltage regulator to the component. The voltage regulator may be coupled to the power state signal line to receive a power state signal from the power manager indicating a power state of the component. The voltage level of the power supplied by the voltage regulator may be dependent on the target voltage level of the voltage regulator, which is dependent on both the power state signal and the current level as shown in the remaining blocks.

At block 420 of FIG. 4 it is determined if there is a change in the current level of the power supplied to the component. If there is a change in the current level, then at block 425 the target voltage level of the power supplied by the voltage regulator may be increased if the current level decreases. Conversely, the target voltage level of the power supplied by the voltage regulator may be decreased if the current level increases.

The method proceeds at block 430 of FIG. 4 where it is determined if there is a change in the power state of the component as indicated by the power state signal. If the power state signal indicates a power state change, then at block 435 the target voltage level of the power supplied by the voltage regulator may be decreased if a wake to sleep state transition is detected. The target voltage level may be increased if a sleep to wake state transition is detected. The method then proceeds back to block 415.

Embodiments have been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A voltage regulator comprising:
an output port to supply power to a component of a computer system, a target voltage level of the power to increase if a current level of the power decreases;
an input port to receive a power state signal, the target voltage level to decrease when the component transitions to a sleep state as indicated by the power state signal; and
a feedback line to couple the output port to the input port, a feedback voltage of the feedback line to be adjusted according to the power state signal, wherein the input port is coupled to an input of an inverted logic device, the inverted logic device having an output coupled to the feedback line to reduce the feedback voltage of the feedback line when the inverted logic device is turned on.

2. The voltage regulator of claim 1, wherein the target voltage level is to decrease if the current level increases.

3. The voltage regulator of claim 1, wherein the target voltage level is to be inversely proportional to the current level while the component is in a wake state as indicated by the power state signal.

4. The voltage regulator of claim 1, wherein the target voltage level is to increase when the component transitions to a wake state as indicated by the power state signal.

5. The voltage regulator of claim 1, further comprising a feedback line to couple the output port to the input port, a feedback voltage of the feedback line to be adjusted according to the power state signal.

6. The voltage regulator of claim 1, wherein the power state signal is to indicate a power state of a plurality of components.

7. The voltage regulator of claim 1, wherein the component is a processor.

8. A computer system comprising:
a component to transition from a sleep state to a wake state; and
a voltage regulator to supply power to the component, a target voltage level of the power to increase when the component transitions from the sleep state to the wake state, the target voltage level to be related to a current level of the power while the component is in a wake state, the voltage regulator including an output port to supply power to the component,
an input port to receive a power state signal, the target voltage level to decrease when the component transitions to a sleep state as indicated by the power state signal, and
a feedback line to couple the output port to the input port a feedback voltage of the feedback line to be adjusted according to the power state signal, wherein the input port is coupled to an input of an inverted logic device, the inverted logic device having an output coupled to the feedback line to reduce the feedback voltage of the feedback line when the inverted logic device is turned on.

9. The computer system of claim 8, wherein the component is a processor.

10. The computer system of claim 9, further comprising a power manager to indicate a power state of the component to the voltage regulator.

11. The computer system of claim 10, wherein the power manager is to indicate the transition from the sleep state to the wake state to the voltage regulator before the component transitions from the sleep state to the wake state, the target voltage level to increase before the component transitions from the sleep state to the wake state.

12. The computer system of claim 10, wherein the power manager is to indicate a transition of the component from the wake state to the sleep state to the voltage regulator before the component transitions from the wake state to the sleep state, the target voltage level to decrease before the component transitions from the wake state to the sleep state.

13. The computer system of claim 10, further comprising a chipset including the power manager.

14. The computer system of claim 8, wherein the target voltage level is to decrease if the current level increases, and the target voltage level is to increase if the current level decreases while the component is in the wake state.

15. The computer system of claim 8, wherein the target voltage level is to be inversely proportional to the current level.

16. The computer system of claim 8, wherein the target voltage level is to decrease when the component transitions from the wake state to the sleep state.

17. The computer system of claim 8, wherein the voltage regulator is to supply the power to a plurality of components.

18. The computer system of claim 8, wherein the voltage regulator is a switching voltage regulator.

19. A method comprising:
coupling a component to a power manager, the component to operate in sleep and wake states;

coupling the power manger to a voltage regulator to provide a power state signal to the voltage regulator to indicate a power state of the component; and coupling the voltage regulator to the component to supply power to the component, a target voltage level of the power to be inversely proportional to a current level of the power when the component is operating in the wake state, the target voltage level to increase when the component transitions from the sleep to the wake state, as indicated by the power state signal, the voltage regulator including an output port to supply power to the component, an input port to receive a power state signal, the target voltage level to decrease when the component transitions to a sleep state as indicated by the power state signal, and a feedback line to couple the output port to the input port, a feedback voltage of the feedback line to be adjusted according to the power state signal, wherein the input port is coupled to an input of an inverted logic device, the inverted logic device having an output coupled to the feedback line to reduce the feedback voltage of the feedback line when the inverted logic device is turned on.

* * * * *

UNITED STATES PATENT AND TRADEMARK OFFICE
CERTIFICATE OF CORRECTION

PATENT NO. : 7,526,663 B2  Page 1 of 1
APPLICATION NO. : 11/402527
DATED : April 28, 2009
INVENTOR(S) : Nguyen et al.

It is certified that error appears in the above-identified patent and that said Letters Patent is hereby corrected as shown below:

Title page, item [75] inventor insert — --Dan Gilbride, Poway, CA--.

Signed and Sealed this

Twentieth Day of April, 2010

David J. Kappos
*Director of the United States Patent and Trademark Office*